United States Patent [19]

Loads

[11] 4,099,345
[45] Jul. 11, 1978

[54] PRODUCTION OF TURF

[75] Inventor: Frederic Walter Loads, Brookhouse, Near Lancaster, England

[73] Assignee: Kapag Manufacturing Co. Limited, Devon, England

[21] Appl. No.: 739,995

[22] Filed: Nov. 8, 1976

[30] Foreign Application Priority Data

Nov. 11, 1975 [GB] United Kingdom .............. 46475/75
May 15, 1976 [GB] United Kingdom .............. 20175/76

[51] Int. Cl.² .............................................. A01G 1/00
[52] U.S. Cl. ............................................ 47/56; 71/24; 111/1
[58] Field of Search ....................................... 71/23–24; 47/56, 58; 111/1

[56] References Cited

U.S. PATENT DOCUMENTS

| 3,607,212 | 9/1971 | Nettesheim et al. ........... 71/24 X |
| 3,845,584 | 11/1974 | Mercer ................................ 47/56 |
| 3,863,388 | 2/1975 | Loads ................................. 47/56 |
| 3,890,739 | 6/1975 | Blackburn .......................... 47/56 |
| 3,914,901 | 10/1975 | Muldner ............................. 47/56 |

FOREIGN PATENT DOCUMENTS 1,290,338 9/1972 United Kingdom ................ 47/56

Primary Examiner—Robert E. Bagwill
Attorney, Agent, or Firm—Young & Thompson

[57] ABSTRACT

In the production of turf, a growing medium including particulate lignite is mixed with grass seed and is then spread out on a water-impervious bed between two parallel kerbs. The bed may comprise flexible plastics sheeting which serves as a backing when the turf is removed from between the kerbs and rolled up.

8 Claims, 2 Drawing Figures

U.S. Patent  July 11, 1978  4,099,345
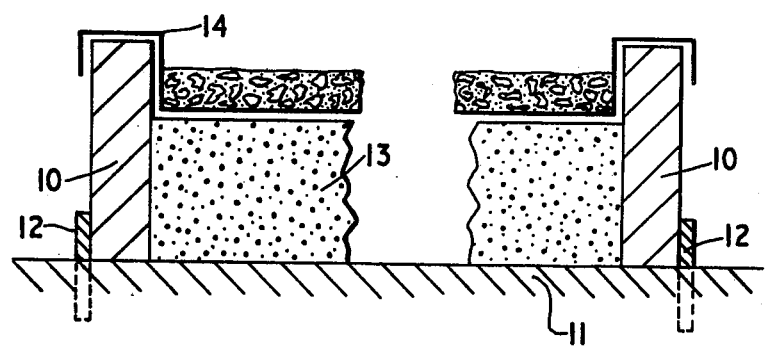
-FIG.1.-
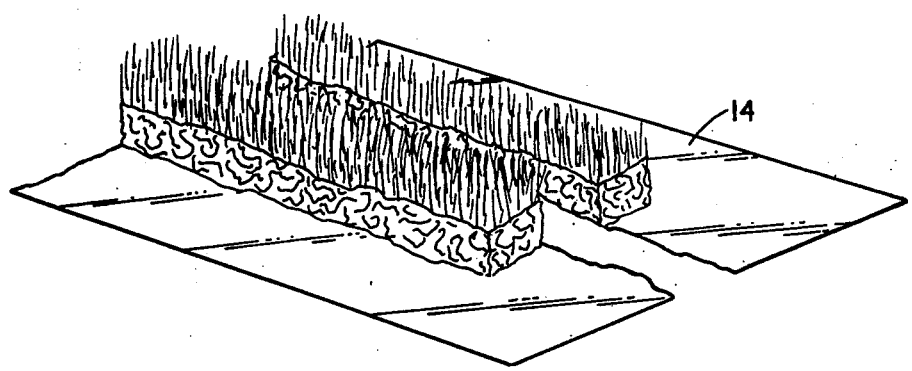
-FIG.2.-

PRODUCTION OF TURF

This invention relates to the production of turf, and is more particularly concerned with a method of producing high quality turf in a rapid and systematic manner.

According to the invention a method of producing turf comprises establishing a layer of a growing medium including particulate lignite and grass seeds on a water-impervious bed between parallel kerbs and, when predetermined growth has taken place, removing the layer from between the kerbs.

The aforesaid water-impervious bed preferably comprises a flexible sheet and the layer of grown turf and sheet may be removed together from a flat supporting surface, the sheet being rolled with the turf as a backing to be stripped off before laying the turf. If desired the flexible sheet may be of synthetic plastics material such as polyethylene sheeting.

Preferably the growing medium and grass seed are mixed in the appropriate proportions and watered until the grass seed reaches the pre-germination stage before the mixture is spread in a thin layer upon the water-impervious bed. The thickness of the spread layer may be as little as ¼ inch, the strong intertwining root formation providing the requisite tensile strength without further support.

In fact it is desirable that the mixture of growing medium and grass seed should be held in a moistened state under conditions favouring germination of the grass seed until the latter reaches the germination stage before it is spread in a thin layer upon the water-impervious bed. Thus, the mixture may be held up to the germination stage indoors and, as soon as chitting of the grass seed appears, may be taken outside and spread in a thin layer upon the water-impervious bed for growing the turf.

The growing medium preferably comprises lignite, with an optional addition of peat, together with a particulate filler such as sand and a binding agent. Trace elements may also be incorporated in the growing medium.

The invention also comprises the turf prepared or produced by the aforesaid method.

The invention will now be more particularly described with reference to the accompanying drawings which illustrate, by way of example, one method of growing turf in accordance with the invention. In the drawings:

FIG. 1 is a transverse sectional view, partly broken away, of a layer of growing medium and admixed germinated grass seeds contained within a rectangular frame, and FIG. 2 is an isometric view, again partly broken away, of a layer of turf removed, together with a flexible water-impervious sheet, from the rectangular frame.

In carrying the invention into effect, a level site is chosen and the ground is sprayed with a total weed killer, if necessary. A number of beds are then marked out on the site, suitable dimensions for a bed being 75 cm. in width and 3 m., or multiples of 3 m., in length. Wooden boards or kerbs 10 are then pegged to the ground 11 edge-on to the ground to form the sides of a rectangular frame and transverse boards (not shown) are pegged crosswise in order to form the ends of the frame. The kerbs 10 may be 3 m. in length, 7.5 cm. wide and 2 cm. thick, whereas the transverse boards are 75 cm. long, 7.5 cm. wide and 2 cm. thick. The pegs 12 are disposed at sufficiently frequent intervals along the kerbs 10 to prevent outward bowing of the latter.

When necessary, a layer of sand 13 is then placed within each frame to a depth of 5 cm., the sand being smoothed out to provide a level surface and firmed or allowed to settle. Polyethylene sheeting 14 is placed upon the surface of the sand, such sheeting extending up the remaining approximate height of 2.5 cm. of the kerbs 10 over the top edges of which it is looped as indicated in FIG. 1 and secured to form a substantially water-tight shallow tray, the ends of the sheeting 14 being looped over the transverse boards at the ends of the kerbs 10.

In an alternative arrangement, the kerbs and boards are erected on a flat concrete base, the layer of sand is omitted and the sheeting is laid directly on the concrete, the kerbs and boards then being only 2.5 cm. in height.

A mixture comprising a growing medium and grass seed is held in a moist state in a greenhouse in conditions favourable to germination of the grass seed. Depending on the temperature in the greenhouse, chitting of the grass seed occurs after about 48 hours and, at this stage, the mixture of growing medium and germinated grass seed is taken into the open and spread upon the polyethylene sheeting 14 to a depth of, for example, 1.25 cm. utilising a screed to obtain a layer of uniform thickness. This leaves a depth of about 1.25 cm. from the top edges of the frame unfilled, thus affording a space serving as a water reservoir with the top edges of the frame forming weirs providing natural overflow of water in excess of requirements from the frame.

The spread layer is watered in, and at no time allowed to dry out. Lavish watering is continued depending on the season and weather, and in hot conditions the frequency of this watering may be up to three times a day. The growing medium may be a mixture of ground lignite and perlite but the preferred mixture is lignite, peat, a particulate filler, such as sand, and macerated or pulverised paper, together with predetermined amounts of trace elements. The composition of the growing medium (apart from the trace elements) may thus be as follows:

| Lignite | 26.3% by weight, |
|---|---|
| Peat | 10.7% by weight, |
| Sand | 29.5% by weight, |
| Pulverised Paper Pulp | 7.4% by weight, and |
| Water | 26.1% by weight. |

With this growing medium, there is a complete absence of root rot despite the frequent and lavish watering and, in fact, with this particular growing medium, watering may not be required with quite such frequency, i.e. three times a day, as has been mentioned above because of the high water absorption and retention characteristics of the particulate lignite. The grass grows rapidly to provide turf with a strong root formation, the roots turning outwardly on striking the sheeting 14 and intertwining with each other to form a thin turf sheet of high tensile strength which is ready for lifting in approximately four weeks. When the turves are ready, they may be rolled up like a carpet with the sheeting 14 serving as a backing which facilitates transport and storage of the rolled turves, the sheeting being removed on site when the turves are laid.

The particular method described above involves keeping the growing medium and grass seed in a greenhouse until chitting of the seed has taken place. However, the period for which this mixture is kept in the greenhouse may be reduced so that the seed only reaches the pre-germination stage before the mixture is taken into the open and spread in a uniform layer on the sheeting 14.

I claim:

1. A method of producing turf comprising establishing a layer of growing medium including grass seed on a water-impervious bed between parallel kerbs and, when predetermined growth has taken place, removing the layer from between the kerbs, said growing medium comprising lignite together with a particulate filler and a binding agent comprising pulverised paper pulp.

2. A method of producing turf according to claim 1, wherein said water-impervious bed comprises a flexible sheet and the layer of grown turf and sheet are removed together, the sheet being rolled with the turf as a backing to be stripped off before laying the turf.

3. A method of producing turf according to claim 2, wherein the kerbs are positioned on a level site, transverse boards are positioned at the ends of the kerbs to form a frame, sand is placed within the frame and the flexible sheeting is laid on the sand.

4. A method of producing turf according to claim 2, wherein the kerbs are placed on a firm flat level base, transverse boards are positioned at the ends of the kerbs to form a frame and the flexible sheeting is laid directly on the firm flat level base.

5. A method of producing turf according to claim 1, wherein the flexible sheet is of synthetic plastics material such as polyethylene sheeting.

6. A method of producing turf according to claim 1, wherein the thickness of the spread layer is as little as ¼ inch, the strong intertwining root formation providing the requisite tensile strength without further support.

7. A method of producing turf according to claim 1, wherein the mixture of growing medium and grass seed is held in a moistened state under conditions favouring germination of the grass seed before it is spread in a thin layer upon the water-impervious bed.

8. A method of producing turf according to claim 7, wherein the mixture is held up to the germination stage indoors and, as soon as chitting of the grass seed appears, is taken outside and spread in a thin layer upon the water-impervious bed for growing the turf.

* * * * *